United States Patent
Tonelli et al.

(10) Patent No.: US 8,664,353 B2
(45) Date of Patent: Mar. 4, 2014

(54) PROCESS FOR THE PURIFICATION OF POLYOL PFPE DERIVATIVES

(75) Inventors: Claudio Adolfo Pietro Tonelli, Sesto San Giovanni (IT); Graziano Giuseppe Vezzulli, Milan (IT); Rosaldo Picozzi, Cesate (IT); Piero Gavezotti, Milan (IT)

(73) Assignee: Solvay Solexis S.P.A., Bollate (IT)

( * ) Notice: Subject to any disclaimer, the term of this patent is extended or adjusted under 35 U.S.C. 154(b) by 167 days.

(21) Appl. No.: 13/319,680

(22) PCT Filed: May 6, 2010

(86) PCT No.: PCT/EP2010/056185
§ 371 (c)(1),
(2), (4) Date: Nov. 9, 2011

(87) PCT Pub. No.: WO2010/130628
PCT Pub. Date: Nov. 18, 2010

(65) Prior Publication Data
US 2012/0059144 A1    Mar. 8, 2012

(30) Foreign Application Priority Data
May 15, 2009 (EP) .................................... 09160387

(51) Int. Cl.
*C08G 64/00* (2006.01)
*C08G 63/02* (2006.01)

(52) U.S. Cl.
USPC .......................................... 528/401; 568/667

(58) Field of Classification Search
USPC .......................................... 528/401; 568/677
See application file for complete search history.

(56) References Cited

U.S. PATENT DOCUMENTS

| 6,953,082 | B2 | 10/2005 | Costello et al. |
| 2003/0100454 | A1 | 5/2003 | Osawa et al. |
| 2004/0092406 | A1 | 5/2004 | Osawa et al. |
| 2007/0051916 | A1 | 3/2007 | Flynn et al. |
| 2007/0298982 | A1 | 12/2007 | Shimokawa |

FOREIGN PATENT DOCUMENTS

| EP | 822216 A2 | 2/1998 |
| EP | 1372141 A1 | 12/2003 |
| JP | 20030041279 A | 2/2003 |
| WO | WO 2010130625 A1 | 11/2010 |

OTHER PUBLICATIONS

Turri, Stefano, et al—"End Group Chemistry of Fluoro-Oligomers: Highly Selective Syntheses of Diepoxy, Diallyl, and Tetraol Derivatives", J. Polym. Sci., A, Polym. Chem., 1996, vol. 34, p. 3263-3275, John Wiley & Sons, Inc.; 13 pgs.

Scicchitano, Massimo, et al—"Synthesis and characterization of low-viscosity fluoropolyether-based segmented oligomers", Die Angewandte Makromoleculare Chemie, 1995, vol. 231, No. 4000, p. 47-60, Hüthig & Wepf Verlag, Zug; 14 pgs.

U.S. Appl. No. 13/319,679, Graziano Giuseppe Vezzulli, et al., filed Nov. 9, 2011.

*Primary Examiner* — Terressa Boykin
(74) *Attorney, Agent, or Firm* — Osha • Liang LLP

(57) ABSTRACT

A process for purifying a polyol(per)fluoropolyether derivative [polyol (P)] from a mixture (M) of hydroxyl(per)fluoropolyether derivatives, such polyol (P) comprising one or more hydroxyl(per)fluoropolyether derivatives [PFPEs (OH)] comprising at least one (per)fluoropolyoxyalkylene chain (chain $R_f$) and at least one end-group having formula ($t_3$): —$CF_2CH_2OCH_2CH(OH)CH_2OCH_2CH(OH)CH_2OH$, such mixture (M) comprising said polyol (P) and at least one hydroxyl(per)fluoropolyether derivative [PFPE (OH)] different from polyol (P) and comprising at least one chain $R_f$ and at least one end-group selected from end-groups having formula ($t_1$): —$CF_2CH_2OH$ and formula ($t_2$): —$CF_2CH_2OCH_2CH(OH)CH_2OH$. The process comprises the following steps: 1) reacting the mixture (M) with a ketone, an aldehyde, or a combination thereof to yield corresponding mixture of cyclic ketal/acetal(per)fluoropolyether derivatives [PFPEs (OH)$_p$] [protected mixture (P)]; 2): submitting the protected mixture (P) to adsorption on silica gel to yield an adsorbed protected product [adsorbed product ($P_p$)] and then recovering a desorbed protected product [desorbed product ($P_p$)] by subsequent desorption from silica gel of the adsorbed product ($P_p$); 3) distilling the desorbed product ($P_p$) under reduced pressure to isolate a protected product residue [product ($P_r$)]; and 4) hydrolyzing the product ($P_r$) to obtain polyol (P).

14 Claims, No Drawings

PROCESS FOR THE PURIFICATION OF POLYOL PFPE DERIVATIVES

This application is a U.S. national stage entry under 35 U.S.C. §371 of International Application No. PCT/EP2010/056185 filed May 6, 2010, which claims priority to European application No. 09160387.8 filed May 15, 2009, the whole content of this application being incorporated herein by reference for all purposes.

TECHNICAL FIELD

The invention pertains to a process for the purification of polyol fluoropolyether compounds useful as additives for lubricants for magnetic media.

BACKGROUND ART

As well known, magnetic recording apparatus are divided into those using a magnetic disk as the medium on which to record data and those using magnetic tape as such medium. Because the former type of recording apparatus using a magnetic disk (hereinafter referred to as magnetic disk drives) is prevailing, the following description focuses on magnetic disk drives as an example of the magnetic recording apparatus.

As the capacity enlargement of magnetic disk drives has been pursued for recent years, the fly height of the magnetic head has been lowered rapidly down to below 30 nm, and, consequently, there is increasing need for reliability in terms of resistance to sliding friction.

Also, there is strong need to enhance the data processing speed with more disk capacity. In particular, in a Redundant Array of Independent Disks (RAID) system, a magnetic disk drive that operates at a disk revolving speed of 10,000 rmp or higher is required.

In order to ensure the reliability of a magnetic disk drive, generally, a lubricant layer is formed on a carbon overcoat on the surface of a magnetic disk for use in the disk drive. As the main material of the lubricant layer, usually, fluoropolyether, which is a chemically stable fluorinated organic compound, is widely used.

Actually, in order to assure reliability of the magnetic disk drive, it is mandatory to efficiently preserve suitable lubricant distribution on the surface of said magnetic disk drive for long operating times. When magnetic disk drives operate, said disks revolve at a high speed and the lubricant might be spun off by the combined action of the air shear due to the air flow on the surface of the disk as the disk revolves, and of the centrifugal force directly exerted on the lubricant. As a consequence, it is often observed that the quantity of the lubricant on the surface of the disk gradually decreases. Also, evaporation phenomena of the lubricant into the atmosphere inside the magnetic drive may take place.

To overcome problems of the lubricant loss by being spun off during disk revolution and natural evaporation, approaches have heretofore been proposed. Thus, a method for restraining the lubricant from being spun off and evaporated has been proposed in which the adhesion force of the lubricant to the disk protecting layer is made stronger by increasing the polarity of the functional end-groups in the lubricant. Said polar end-groups are believed to improve adherence of the lubricant to the surface of the magnetic media.

Within this approach, fluoropolyether lubricants based on fluoropolyethers as the backbone and having hydroxyl functional groups as their end-groups have shown best performances.

A class of compounds which have been found to plenty fulfill requirements for being used as magnetic media lubricants are fluoropolyether derivatives comprising fluoropolyoxyalkylene chains and end-groups comprising multiple hydroxyl groups.

Such materials can be notably manufactured by reaction of epihalohydrins with perfluoropolyether derivatives having two hydroxyl end-groups (see Scheme 1 here below), as taught in TURRI, Stefano, et al. End group chemistry of fluoro-oligomers: highly selective syntheses of diepoxy, diallyl, and tetraol derivatives. (A) *J. polym. sci., A, Polym. chem.*, 1996, vol. 34, p. 3263-3275.

Scheme 1

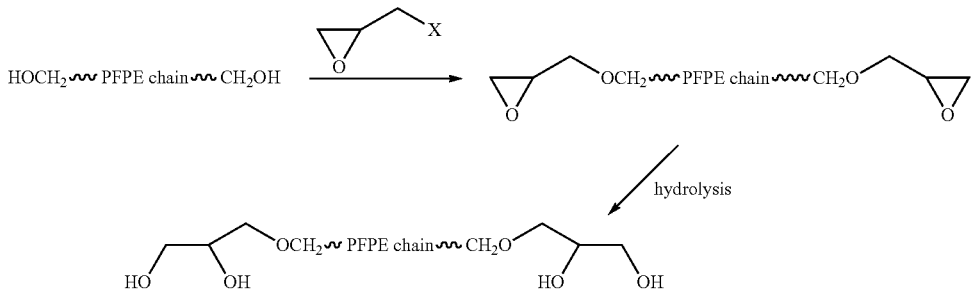

Despite above sketched stoichiometry, side reactions are likely to occur during nucleophilic substitution on the epihalohydrin, involving e.g. reactions of oxirane ring with further PFPE hydroxyl derivatives, yielding materials comprising more than one PFPE chain block and/or different hydroxyl groups.

Similarly, reaction of perfluoropolyether derivatives having two hydroxyl end-groups with glycidol of formula:

as described in SCHICCHITANO, Massimo, et al. Synthesis and characterization of low-viscosity fluoropolyether-based segmented oligomers. *Die Angewandte Makromolekulare Chemie.* 1995, vol. 231, no. 1, p. 47-60, yields, in addition to the expected epoxy-substituted derivatives (which can be further converted in corresponding diols), a large range of side-products. As an example, PFPE hydroxyl derivatives can open the oxirane ring of the targeted compound, yielding materials comprising more than one PFPE chain block, and/or, more frequently, a further glycidol molecule can react with the epoxide ring of above mentioned targeted epoxy-substituted intermediate, so that different species are formed.

Mixtures obtained from processes of the prior art are thus generally complex compositions comprising unreacted precursors, targeted polyol derivatives and polymeric material comprising several PFPE chain blocks and/or several ex-glycidol molecules moieties, which require burdensome separation procedures.

Also, the broad molecular weight distribution of the starting perfluoropolyether diol mixture used for manufacturing corresponding tetraol derivatives by reaction with glycidol and/or epihalohydrins as above detailed makes it even more difficult to separate materials based on their respective volatility, as this parameter is both affected by the molecular weight and the functionality degree of the end-chains.

Complex purification procedures, based e.g. on supercritical carbon dioxide extraction techniques are thus required for purifying target material, so as to achieve the expected chemical structure and level of functionality at the end-groups.

Approaches of this type are described, for instance, in US 2004092406 (FUJI ELECTRIC CO LTD (JP)) May 13, 2004, in US 2003100454 (FUJI ELECTRIC CO LTD (JP)) May 29, 2003 and EP 1372141 A (HITACHI LTD (JP)) Dec. 17, 2003.

Due to the extreme wear conditions wherein said lubricants are to be used, in particular for hard disks lubrication, it is essential to be able to isolate compounds having well-defined functionality in end-groups and thus homogeneous behaviour in lubrication, adherence and resistance against evaporative loss.

The need was thus felt in the art for a process for the purification of hydroxyl(per)fluoropolyether derivatives aiming at lowering energy consumption and simplifying operations, which could provide for (per)fluoropolyether polyols having at least one end-group containing three hydroxyl groups.

DISCLOSURE OF INVENTION

It is thus an object of the present invention a process for the purification of a polyol(per)fluoropolyether derivative [polyol (P)], said polyol (P) comprising one or more hydroxyl (per)fluoropolyether derivatives [PFPEs (OH)] comprising at least one (per)fluoropolyoxyalkylene chain (chain $R_f$) and at least one end-group having formula —$CF_2CH_2OCH_2CH(OH)CH_2OCH_2CH(OH)CH_2OH$ ($t_3$), from a mixture of hydroxyl(per)fluoropolyether derivatives [mixture (M)], said mixture (M) comprising said polyol (P) and at least one hydroxyl(per)fluoropolyether derivative [PFPE (OH)] different from polyol (P) and comprising at least one (per)fluoropolyoxyalkylene chain (chain $R_f$) and at least one end-group selected from those having formulae —$CF_2CH_2OH$ ($t_1$) and —$CF_2CH_2OCH_2CH(OH)CH_2OH$ ($t_2$), said process comprising the following steps:

step 1: reacting the mixture (M) with a ketone and/or an aldehyde so as to yield corresponding mixture of cyclic ketal/acetal(per)fluoropolyether derivatives [PFPEs $(OH)_p$] [protected mixture (P)];

step 2: submitting the protected mixture (P) to adsorption on silica gel so as to yield an adsorbed protected product [adsorbed product ($P_p$)] and then recovering a desorbed protected product [desorbed product ($P_p$)] by subsequent desorption from silica gel of said adsorbed product ($P_p$);

step 3: distilling the desorbed product ($P_p$) under reduced pressure so as to isolate a protected product residue [product ($P_r$)];

step 4: hydrolyzing the product ($P_r$) so as to obtain polyol (P).

The Applicant has found that by means of the process of the invention it is advantageously possible to isolate polyols (P) to be successfully used as additives for lubricants for magnetic media.

The hydroxyl(per)fluoropolyether derivative [PFPE (OH)] typically comprises at least one (per)fluoropolyoxyalkylene chain (chain $R_f$) and at least one end-group selected from the followings:

($t_1$) —$CF_2CH_2OH$;
($t_2$) —$CF_2CH_2OCH_2CH(OH)CH_2OH$;
($t_3$) —$CF_2CH_2OCH_2CH(OH)CH_2OCH_2CH(OH)CH_2OH$.

The (per)fluoropolyoxyalkylene chain (chain $R_f$) of the PFPE (OH) is typically a chain comprising recurring units $R°$, said recurring units having general formula —$(CF_2)_j$—CFK—O—, wherein j is an integer of from 0 to 3 and K is selected between a fluorine atom and a $C_1$-$C_5$ perfluoro(oxy)alkyl group.

The hydroxyl(per)fluoropolyether derivative [PFPE (OH)] preferably complies with formula (I-A) here below:

$$T_1\text{-}O\text{—}R_f\text{-}T_2 \qquad \text{(I-A), wherein:}$$

$R_f$ is a (per)fluoropolyoxyalkylene chain (chain $R_f$);
$T_1$ and $T_2$, equal or different from each other, are independently selected from the end-groups having formulae ($t_1$), ($t_2$) and ($t_3$) as defined above.

The hydroxyl(per)fluoropolyether derivative [PFPE (OH)] more preferably complies with formula (II-A) here below:
$T_1$-O—$(CFX^1O)_{c1}(CFX^2CFX^3O)_{c2}(CF_2CF_2CF_2O)_{c3}(CF_2CF_2CF_2CF_2O)_{c4}$-$T_2$ (II-A), wherein:

$X^1$, $X^2$ and $X^3$, equal or different from each other, are independently selected between a fluorine atom and a —$CF_3$ group;
$T_1$ and $T_2$ are defined as above;
c1, c2, c3 and c4, equal or different from each other, are independently integers≥0 such that the sum c1+c2+c3+c4 is in the range between 5 and 2000, preferably between 10 and 500; should at least two of c1, c2, c3 and c4 be different from zero, the recurring units are generally statistically distributed along the (per)fluoropolyoxyalkylene chain.

The hydroxyl(per)fluoropolyether derivative [PFPE (OH)] even more preferably complies with formula (III-A) here below:

$$T_1\text{-}O(CF_2O)_{c1}(CF_2CF_2O)_{c2}\text{-}T_2 \qquad \text{(III-A), wherein:}$$

$T_1$ and $T_2$ are defined as above;
c1 and c2 are independently integers>0 such that the sum c1+c2 is in the range between 5 and 2000, preferably between 10 and 500, the recurring units being generally statistically distributed along the (per)fluoropolyoxyalkylene chain.

The polyol(per)fluoropolyether derivative [polyol (P)] preferably comprises a hydroxyl(per)fluoropolyether derivative [PFPE (OH)] complying with formula (I-A) as described above, wherein one of $T_1$ and $T_2$ is an end-group having formula ($t_3$) as defined above, the reminder being an end-group having formula ($t_2$) as defined above, that is to say that the polyol (P) preferably comprises a pentaol(per)fluoropolyether derivative [pentaol (P)].

The polyol (P) more preferably comprises a hydroxyl(per)fluoropolyether derivative [PFPE (OH)] complying with formula (II-A) as described above, wherein $T_1$ and $T_2$ are defined as above.

The polyol (P) even more preferably comprises a hydroxyl (per)fluoropolyether derivative [PFPE (OH)] complying with formula (III-A) as described above, wherein $T_1$ and $T_2$ are defined as above.

The mixture (M) preferably comprises a polyol (P) as defined above and at least one hydroxyl(per)fluoropolyether derivative [PFPE (OH)] which is different from said polyol (P) and complies with formula (I-A) as described above, wherein $T_1$ and $T_2$ independently represent end-groups having formulae $(t_1)$ and $(t_2)$ as defined above.

The mixture (M) more preferably comprises a polyol (P) as defined above and at least one hydroxyl(per)fluoropolyether derivative [PFPE (OH)] which is different from said polyol (P) and complies with formula (II-A) as described above, wherein $T_1$ and $T_2$ are defined as above.

The mixture (M) even more preferably comprises a polyol (P) as defined above and at least one hydroxyl(per)fluoropolyether derivative [PFPE (OH)] which is different from said polyol (P) and complies with formula (III-A) as described above, wherein $T_1$ and $T_2$ are defined as above.

The mixture (M) is typically manufactured reacting at least one diol(per)fluoropolyether derivative [PFPE (OH)$_2$] comprising at least one (per)fluoropolyoxyalkylene chain (chain $R_f$) and two diol end-groups with epihalohydrins or with glycidol having formula:

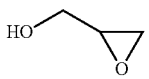

The diol(per)fluoropolyether derivative [PFPE (OH)$_2$] typically complies with formula (I-A) as described above, wherein $T_1$ and $T_2$ both comply with end-groups having formula $(t_1)$ as defined above.

The diol(per)fluoropolyether derivative [PFPE (OH)$_2$] has preferably a polydispersity index (PDI) ranging from 1 to 1.4, more preferably from 1 to 1.35, even more preferably from 1 to 1.3.

The polydispersity index (PDI) is hereby expressed as the ratio of weight average molecular weight ($M_w$) to number average molecular weight ($M_n$), as determined notably by GPC, wherein:

weight average molecular weight ($M_w$) is:

$$M_w = \frac{\sum M_i^2 \cdot N_i}{\sum M_i \cdot N_i}$$

number average molecular weight ($M_n$) is:

$$M_n = \frac{\sum M_i \cdot N_i}{\sum N_i}.$$

Non-limitative examples of suitable PFPEs (OH)$_2$ include, notably, diol (per)fluoropolyether derivatives available from Solvay Solexis S.p.A. under the tradenames FOMBLIN® Z-DOL 1000 (polydispersity index of about 1.07), FOMBLIN® Z-DOL 2000 (polydispersity index of about 1.05), FOMBLIN® Z-DOL 2000 (polydispersity index of about 1.25), FOMBLIN® Z-DOL 3000 (polydispersity index of about 1.08).

The mixture (M) is preferably manufactured reacting at least one diol(per)fluoropolyether derivative [PFPEs (OH)$_2$] as defined above with glycidol.

The mixture (M) is more preferably manufactured reacting at least one diol(per)fluoropolyether derivative [PFPE (OH)$_2$] as defined above with glycidol, wherein the glycidol/PFPE (OH)$_2$ equivalent ratio is typically higher than 1.1 and typically lower than 1.4.

By carrying out the reaction of at least one PFPE (OH)$_2$ with glycidol with a glycidol/PFPE (OH)$_2$ equivalent ratio higher than 1.1 and lower than 1.4, preferably ranging between 1.2 and 1.35, it is advantageously possible to successfully obtain a mixture (M) comprising a mixture of hydroxyl(per)fluoropolyether derivatives [PFPEs (OH)], wherein at least 15% by moles of end-groups are end-groups having formula $(t_3)$ as defined above.

When the glycidol/PFPE (OH)$_2$ equivalent ratio is 1.1 or lower, a mixture (M) comprising polyol (P) is generally obtained, wherein nevertheless main component is tetraol (T). While these mixtures can be indeed used in the purification process of the present invention, these are not generally preferred.

For the avoidance of doubt, the term "tetraol (T)" is hereby intended to denote a hydroxyl(per)fluoropolyether derivative [PFPE (OH)] complying with formula (I-A) as described above, wherein $T_1$ and $T_2$ both comply with end-groups having formula $(t_2)$ as defined above.

When the glycidol/PFPE (OH)$_2$ equivalent ratio is equal to or higher than 1.4, a mixture (M) comprising polyol (P) is generally obtained, wherein nevertheless hexaol (H) is present. While these mixtures can be indeed used in the purification process of the present invention, these are not generally preferred, as preferred polyol (P) is a pentaol (P) as defined above.

For the avoidance of doubt, the term "hexaol (H)" is hereby intended to denote a polyol(per)fluoropolyether derivative [polyol (P)] complying with formula (I-A) as described above, wherein $T_1$ and $T_2$ both comply with end-groups having formula $(t_3)$ as defined above.

The mixture (M) typically comprises a mixture of hydroxyl (per)fluoropolyether derivatives [PFPEs (OH)] comprising the following end-groups:

from 1% to 10% by moles, preferably from 2% to 8% by moles of end-groups having formula $(t_1)$ as defined above;

from 60% to 90% by moles, preferably from 65% to 80% by moles of end-groups having formula $(t_2)$ as defined above;

from 15% to 40% by moles, preferably from 20% to 30% by moles of end-groups having formula $(t_3)$ as defined above.

Step 1 of the process of the invention is advantageously carried out by reacting the mixture (M) with a ketone and/or an aldehyde so as to yield corresponding mixture of cyclic ketal/acetal(per)fluoropolyether derivatives [PFPEs (OH)$_p$] [protected mixture (P)].

Non-limitative examples of suitable ketones and aldehydes include, notably, acetone, methylethylketone, cyclohexanone, phenylmethylketone, acetaldehyde.

Step 1 is typically carried out in the presence of a protic acid. Non-limitative examples of suitable protic acids include, notably, p-toluensulphonic acid, acetic acid, sulphuric acid.

Step 1 is optionally carried out in the presence of one or more organic solvents (S) able to at least partially dissolve the mixture (M) and the ketone and/or the aldehyde. Non-limitative examples of suitable organic solvents (S) include, notably, petroleum ether, butyl acetate, dimethylformamide, toluene, hexane. According to certain embodiments of the invention, step 1 is carried out in the absence of one or more organic solvents (S) as defined above, the ketone and/or the aldehyde also effecting at least partial solubilisation of mixture (M).

Couples of hydroxyl groups on vicinal carbon atoms of the hydroxyl(per)fluoropolyether derivatives [PFPEs (OH)] of the mixture (M) are advantageously selectively protected in step 1 of the process of the invention due to the increased stability of the five-membered cyclic ketal/acetal structures so obtained with respect to reaction of distal hydroxyl groups of said PFPEs (OH) with a ketone and/or an aldehyde.

Thus, it has been found that in step 1 of the process of the invention end-groups having formulae ($t_2$) and ($t_3$) as defined above typically react to advantageously yield corresponding protected or hemi-protected end-groups having formulae ($t_{2p}$) and ($t_{3p}$) respectively as sketched in the scheme here below, whereas end-groups having formula ($t_1$) remain unreacted under the same conditions:

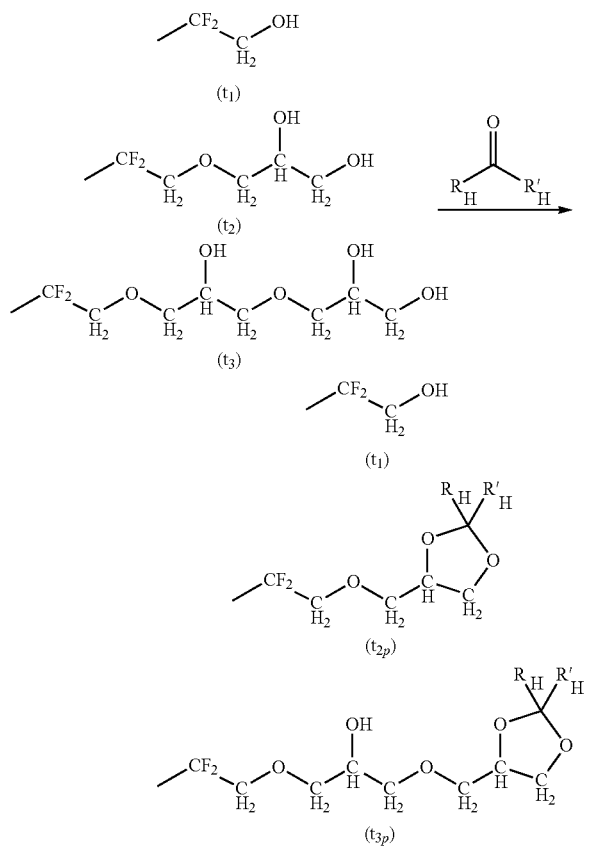

For the avoidance of doubt, in the scheme hereinabove $R_H$ and $R'_H$ are intended to independently represent a hydrogen atom or a $C_1$-$C_{12}$ hydrocarbon group, with the proviso that at least one of $R_H$ and $R'_H$ is different from hydrogen.

The cyclic ketal/acetal(per)fluoropolyether derivative [PFPE (OH)$_p$] typically comprises at least one (per)fluoropolyoxyalkylene chain (chain $R_f$) and at least one end-group selected from those having formulae ($t_1$), ($t_{2p}$) and ($t_{3p}$) as defined in the scheme hereinabove.

The cyclic ketal/acetal(per)fluoropolyether derivative [PFPE (OH)$_p$] preferably complies with formula (I-B) here below:

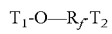    (I-B), wherein:

$R_f$ is a (per)fluoropolyoxyalkylene chain (chain $R_f$);

$T'_1$ and $T'_2$, equal or different from each other, are independently selected from the end-groups having formulae ($t_1$), ($t_{2p}$) and ($t_{3p}$) as defined above.

The protected mixture (P) typically comprises a hemi-protected polyol (P) [polyol ($P_p$)], said polyol ($P_p$) comprising one or more cyclic ketal/acetal(per)fluoropolyether derivatives [PFPEs (OH)$_p$] comprising at least one (per)fluoropolyoxyalkylene chain (chain $R_f$) and at least one end-group having formula ($t_{3p}$) as defined above, and at least one cyclic ketal/acetal(per)fluoropolyether derivative [PFPE (OH)$_p$] which is different from said polyol ($P_p$) and comprises at least one (per)fluoropolyoxyalkylene chain (chain $R_f$) and at least one end-group selected from those having formulae ($t_1$) and ($t_{2p}$) as defined above.

In step 2 of the process of the invention, the protected mixture (P) is submitted to adsorption on silica gel so as to yield an adsorbed protected product [adsorbed product ($P_p$)] and a desorbed protected product [desorbed product ($P_p$)] is then recovered by subsequent desorption from silica gel of said adsorbed product ($P_p$).

For the purpose of the invention, the "adsorption on silica gel" is hereby intended to denote the reversible process of physical-chemical binding of a substance to an adsorbent silica gel substrate and the "desorption from silica gel" is hereby intended to denote the reverse process of adsorption on silica gel as defined hereinabove whereby the adsorbed substance is removed from the adsorbent silica gel substrate.

For the purpose of the invention, the term "silica gel" is hereby intended to represent silica particles prepared by precipitation of colloidal silica followed by dehydration, said silica particles containing silicon dioxide in an amount of from about 96.5% by weight to about 99.6% by weight. The term "colloidal silica" is hereby intended to denote an aqueous dispersion containing amorphous silica particles in an amount of from about 15% by weight to about 50% by weight. The term "amorphous silica particles" is hereby intended to denote that silica particles do not have a crystalline structure as defined by X-ray diffraction measurements.

The silica gel has a BET specific surface area ranging preferably from 200 m$^2$/g to 800 m$^2$/g, more preferably from 250 m$^2$/g to 700 m$^2$/g, even more preferably from 400 m$^2$/g to 600 m$^2$/g. The BET specific surface area is measured as per the Brunauer, Emmett and Teller method according to ISO 9277 using nitrogen.

Non-limitative examples of suitable silica gels include, notably, silica gels having an average particle size in the range of 50-100 mesh, 70-230 mesh and 230-400 mesh as defined by the U.S. Standard Sieve Series according to ASTM E-11-61.

In step 2 of the process of the invention, the protected mixture (P) is submitted to adsorption on silica gel typically in the presence of (per)fluoropolyethers having non functional end-groups which are able to dissolve said protected mixture (P). The protected mixture (P)/silica gel weight ratio generally ranges between 1 and 4, preferably ranges between 1 and 3.5, more preferably ranges between 1 and 3.

The (per)fluoropolyethers having non functional end-groups preferably comply with formula here below:

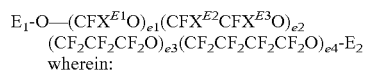
wherein:

$X^{E1}$, $X^{E2}$ and $X^{E3}$, equal or different from each other, are independently selected between a fluorine atom and a —$CF_3$ group;

$E_1$ and $E_2$ are $C_1$-$C_6$ (per)fluoroalkyl groups, optionally comprising an atom selected between hydrogen and chlorine;

e1, e2, e3 and e4, equal or different from each other, are independently integers≥0 such that the sum c1+c2+c3+c4 is in the range between 1 and 100, preferably between 2 and 20; should at least two of e1, e2, e3 and e4 be different from zero, the recurring units are generally statistically distributed along the (per)fluoropolyoxyalkylene chain.

Non-limitative examples of suitable (per)fluoropolyethers having non-functional end-groups include, notably, GALDEN® ZV60 perfluoropolyether and hydrofluoropolyethers notably disclosed in US 2007051916 (3M INNOVATIVE PROPERTIES CO.) Mar. 8, 2007 or in U.S. Pat. No. 6,953,082 (3M INNOVATIVE PROPERTIES CO.) Oct. 11, 2005.

In step 2 of the process of the invention, the desorption from silica gel of the adsorbed product ($P_p$) is typically carried out by extracting said adsorbed product ($P_p$) by one or more organic solvents (S') and then recovering by separation from the silica gel the corresponding desorbed product ($P_p$).

Among suitable separation techniques, mention can be notably made of filtration.

The organic solvent (S') is typically a polar organic solvent ($S'_p$). The polar organic solvent ($S'_p$) is preferably selected among alcohols, ketones, carboxylic acids, nitriles, amides, esters, alkylsulphoxides, more preferably among alcohols. Non-limitative examples of suitable polar organic solvents ($S'_p$) include, notably, methanol, ethanol, propanol, acetic acid, methyl or ethyl acetate, acetonitrile, dimethylformamide, acetone, methylethylketone, dimethylsulphoxide.

In step 2 of the process of the invention, the desorption from silica gel of the adsorbed product ($P_p$) is typically carried out at temperatures ranging between room temperature and the normal boiling point of the organic solvent (S') as defined above, preferably at temperatures ranging between room temperature and 100° C. The desorption from silica gel of the adsorbed product ($P_p$) is typically carried out at atmospheric pressure.

For the avoidance of doubt, the term "adsorbed protected product [adsorbed product ($P_p$)]" is hereby intended to denote polyol ($P_p$) as defined above adsorbed on silica gel and the term "desorbed protected product [desorbed product ($P_p$)]" is hereby intended to denote polyol ($P_p$) as defined above dissolved in one or more organic solvents (S') as defined above.

In step 3 of the process of the invention, the desorbed product ($P_p$), as recovered from step 2, is submitted to distillation under reduced pressure so as to isolate a protected product residue [product ($P_r$)].

For the avoidance of doubt, the term "protected product residue [product ($P_r$)]" is hereby intended to denote polyol ($P_p$) as defined above.

In step 4 of the process of the invention, the product ($P_r$), as recovered from step 3, is submitted to hydrolysis so as to obtain polyol (P) as defined above.

The hydrolysis is typically carried out under acid catalysis. The product ($P_r$), as recovered from step 3, is generally contacted with an acid aqueous or an acid aqueous alcoholic solution (e.g. an aqueous or an aqueous alcoholic solution of HCl, $H_2SO_4$, $CH_3COOH$).

The polyol (P) typically comprises an amount of pentaol (P) as defined above of at least 50% by moles, preferably of at least 55% by moles, more preferably of at least 60% by moles.

Notwithstanding the multi-step process of the invention, wherein each of the above-mentioned steps proceeds with quantitative conversion and high selectivity, the Applicant has found that by means of said process it is thus possible to advantageously recover polyols (P) which can be successfully used as additives for lubricants for magnetic media.

Should the disclosure of any patents, patent applications, and publications which are incorporated herein by reference conflict with the description of the present application to the extent that it may render a term unclear, the present description shall take precedence.

The present invention will be now described in more detail with reference to the following examples, whose purpose is merely illustrative and not limitative of the scope of the invention.

EXAMPLE 1

Synthesis of Mixture (M1)

Reaction of FOMBLIN® Z-DOL 2000 PFPE (Polydispersity Index of About 1.05) with Glycidol FOMBLIN® Z-DOL 2000 PFPE (EW 994 g/eq.; 3.62 eq.; polydispersity index of about 1.05) was charged into a 10 lt. jacketed reactor equipped with a thermometer, a condenser and a mechanical stirrer and heated to 40° C. by diathermic oil circulation in the jacket.

0.36 moles of potassium tert-butylate were then added thereto and the so-obtained mixture was stirred until complete dissolution.

The temperature was raised to 65° C. and 4.89 moles of glycidol were fed into the reactor during 6 hours.

The reaction was carried out during 4 hours. The reaction mixture was then cooled down to room temperature and a crude product was recovered by washing with a mixture of 690 g of demineralised water, 200 g of a 30 wt. % aqueous solution of HCl and 690 g of isobutylic alcohol and subsequent washing with 2×450 g of demineralised water.

The reaction product (3.77 Kg, 3.47 eq.) was recovered by distillation under reduced pressure (yield: 95.9%) and characterized by $^1$H-NMR analysis as such and after derivatization treatment with trifluoroacetic anhydride.

Derivatized products were prepared by treating 5 g of the reaction product with 10 g of trifluoroacetic anhydride so as to convert hydroxyl groups into corresponding trifluoroacetate groups. The excess trifluoroacetic anhydride was removed by distillation under reduced pressure.

Results are summarized here below:

$^1$H-NMR (neat sample): a complex pattern of signals around 3.3-4.0 ppm (due to —$CH_2$— and —CH(–)— groups, intensity: about 8H) and a signal at 4.9 ppm (due to the —OH groups, intensity: about 2.2H) were detected.

$^1$H-NMR (freon 113-acetone solution of derivatized sample):

5.0 ppm —$CH_2$— group of $R_fCF_2CH2OCOCF_3$;

5.7 ppm —CH— group of $R_fCF_2CH_2OCH_2$ $CH(OCOCF_3)CH_2OCOCF_3$ and $R_fCF_2CH_2OCH_2CH$ (OCOCF$_3$)$CH_2OCH_2CH(OCOCF_3)CH_2OCOCF_3$;

5.4 ppm —CH— group of $R_fCF_2CH_2OCH_2$ $CH(OCOCF_3)CH_2OCH_2CH(OCOCF_3)CH_2OCOCF_3$;

3.7-4.8 signals of other —$CH_2$— groups.

The analysis yielded the following end-groups composition:

5% by moles of end-groups of formula —$CF_2CH_2OH$;

70% by moles of end-groups of formula —$CF_2CH_2OCH_2CH(OH)CH_2OH$;

25% by moles of end-groups of formula —$CF_2CH_2OCH_2CH(OH)CH_2OCH_2CH(OH)CH_2OH$.

As determined by GPC analysis, the product had an average molecular weight of 2192 g/mol and a polydispersity index of 1.05.

Step 1.1: Protection of Vicinal Hydroxyl Groups

In a 10 lt. jacketed reactor, equipped with a thermometer, a magnetic stirrer and a total reflux phase-separating head, 3.77 Kg (3.47 eq.) of the product obtained as in Example 1, synthesis of mixture (M1), 1800 g of acetone, 850 g of petroleum ether and 1 ml of 96% sulphuric acid were introduced.

The reaction mixture was refluxed under stirring and water was removed and collected in an external trap. When water evolution stopped (about 20 hours), the mixture was cooled down to room temperature and 10 g of anhydrous sodium acetate were added. After 30 minutes under stirring, the mixture was filtered and petroleum ether and acetone were removed by distillation under reduced pressure.

A clear low-viscous product (4.0 Kg, 3.47 eq.) was isolated (yield: 100%) and characterized by $^1$H-NMR.

$^1$H NMR (A113/CD$_3$OD): CH$_3$ 1.32 and 1.37 ppm (6H); a complex pattern of signals at 3.5-4.3 ppm (about 8H) due to other protons (the complexity is originated by the presence of the cyclic ketal which contains a stereogenic center).

Step 1.2 and 1.3: Adsorption/Desorption on Silica Gel and Distillation Under Reduced Pressure In a 15 lt. jacketed reactor, equipped with a thermometer, 4 Kg (3.47 eq.) of the product obtained as in Example 1, step 1.1, 12 Kg of GALDEN® ZV60 PFPE and 1.85 Kg of silica gel (60-90 mesh) dried at 200° C. for 15 hours were introduced.

The so-obtained suspension was stirred during 2 hours and then filtered. Recovered silica gel was treated with 4.3 Kg of methanol at 60° C. during 3 hours. The suspension was cooled down to room temperature and then filtered.

A clear low-viscous product (1.56 Kg, 1.37 eq.) was isolated by filtration and subsequent distillation under reduced pressure (yield: 96%) and characterized by $^1$H-NMR.

$^1$H NMR (A113/CD$_3$OD): —CH$_3$ 1.32 and 1.37 ppm (6H), —OH 4.9 ppm (about 0.5H) and a complex pattern of signals at 3.5-4.3 ppm (about 9.5H) due to other protons (the complexity is originated by the presence of the cyclic ketal which contains a stereogenic center).

Step 1.4: Deprotection

In a 5 lt. jacketed reactor, equipped with a thermometer, a magnetic stirrer and a condenser, 1.56 Kg of the product obtained as in Example 1, step 1.3, 380 g of methanol, 170 g of demineralised water and 42 g of a 30 wt. % aqueous solution of HCl were introduced. The reaction mixture was heated to 65° C. under stirring during 4 hours.

A clear solid product (1.50 Kg) was recovered by distillation under reduced pressure and characterized by $^1$H-NMR following same procedure as detailed in Example 1, synthesis of mixture (M1).

Results are summarized here below:

$^1$H-NMR (freon 113-acetone solution of derivatized sample):

5.7 ppm —CH— group of R$_f$CF$_2$CH$_2$OCH$_2$CH(OCOCF$_3$)CH$_2$OCOCF$_3$ and R$_f$CF$_2$CH$_2$OCH$_2$CH(OCOCF$_3$)CH$_2$OCH$_2$CH(OCOCF$_3$)CH$_2$OCOCF$_3$;

5.4 ppm —CH— group of R$_f$CF$_2$CH$_2$OCH$_2$CH(OCOCF$_3$)CH$_2$OCH$_2$CH(OCOCF$_3$)CH$_2$OCOCF$_3$;

3.7-4.8 signals of other —CH$_2$— groups.

The analysis yielded the following end-groups composition:

53% by moles of end-groups of formula —CF$_2$CH$_2$OCH$_2$CH(OH)CH$_2$OH;

47% by moles of end-groups of formula —CF$_2$CH$_2$OCH$_2$CH(OH)CH$_2$OCH$_2$CH(OH)CH$_2$OH.

The composition of the mixture, as determined by $^1$H-NMR analysis, was the following:

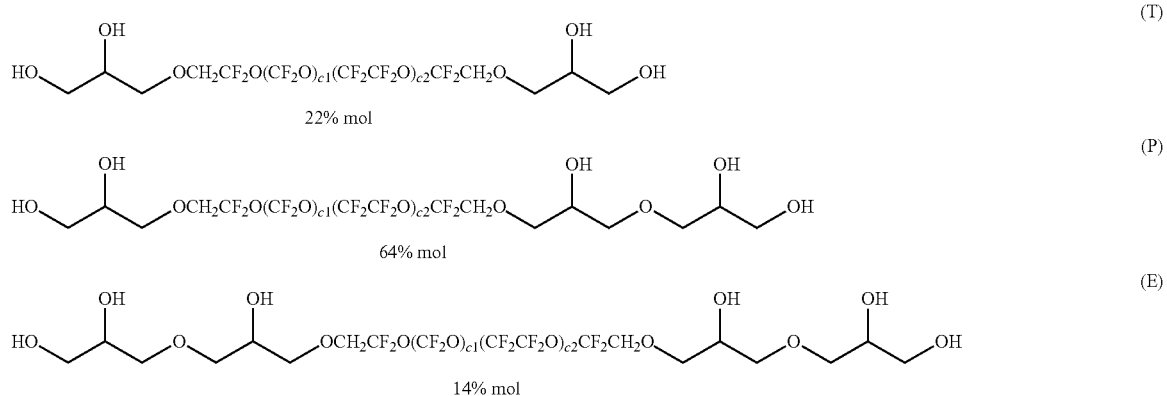

As determined by GPC analysis, the product had an average molecular weight of 2164 g/mol and a polydispersity index of 1.05.

EXAMPLE 2

Synthesis of Mixture (M2)

Reaction of FOMBLIN® Z-DOL 2000 PFPE (Polydispersity Index of About 1.25) with Glycidol Same procedure as detailed in Example 1, synthesis of mixture (M1), was followed, but reacting 3.58 eq. of FOMBLIN® Z-DOL 2000 PFPE (EW 1006 g/eq.; polydispersity index of about 1.25) with 4.83 moles of glycidol during 5 hours.

The reaction product (3.7 Kg, 3.38 eq.) was recovered by distillation under reduced pressure (yield: 94.5%) and characterized by $^1$H-NMR analysis following same procedure as detailed in Example 1, synthesis of mixture (M1).

The analysis yielded the following end-groups composition:

5% by moles of end-groups of formula —$CF_2CH_2OH$;

68% by moles of end-groups of formula —$CF_2CH_2OCH_2CH(OH)CH_2OH$;

27% by moles of end-groups of formula —$CF_2CH_2OCH_2CH(OH)CH_2OCH_2CH(OH)CH_2OH$.

The analysis yielded the following end-groups composition:

2% by moles of end-groups of formula —$CF_2CH_2OH$;

51% by moles of end-groups of formula —$CF_2CH_2OCH_2CH(OH)CH_2OH$;

47% by moles of end-groups of formula —$CF_2CH_2OCH_2CH(OH)CH_2OCH_2CH(OH)CH_2OH$.

The composition of the mixture, as determined by $^1$H-NMR analysis, was the following:

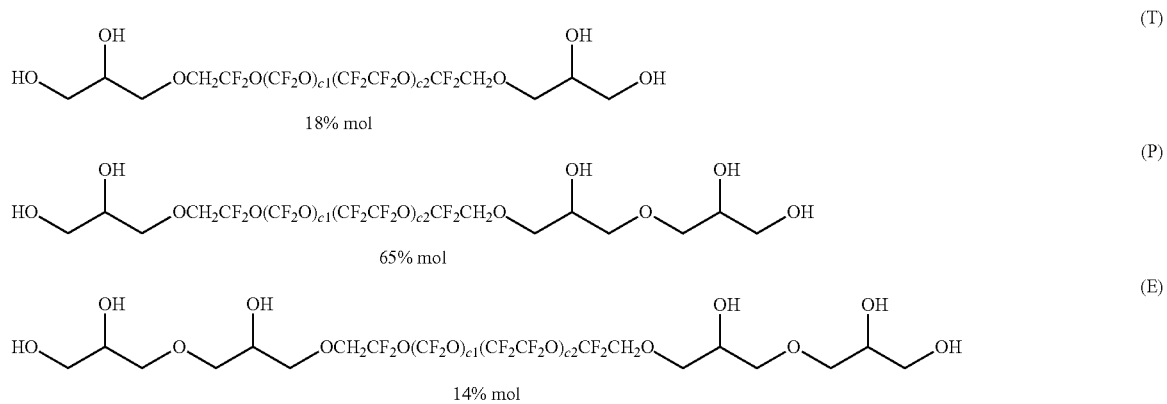

As determined by GPC analysis, the product had an average molecular weight of 2196 g/mol and a polydispersity index of 1.28.

Step 2.1: Protection of Vicinal Hydroxyl Groups

Same procedure as detailed in Example 1, step 1.1, was followed but charging the reactor with 3.7 Kg (3.38 eq.) of the product obtained as in Example 2, synthesis of mixture (M2).

A clear low-viscous product (3.74 Kg, 3.3 eq.) was isolated (yield: 97.5%) and characterized by $^1$H-NMR analysis.

Step 2.2 and 2.3: Adsorption/Desorption on Silica Gel and Distillation Under Reduced Pressure Same procedure as detailed in Example 1, step 1.2 and 1.3, was followed but charging the reactor with 3.74 Kg (3.3 eq.) of the product obtained as in Example 2, step 2.1, and then treating silica gel recovered from filtration of the obtained suspension with 4.4 Kg of methanol.

A clear low-viscous product (1.64 Kg, 1.44 eq.) was isolated by filtration and subsequent distillation under reduced pressure (yield: 94%) and characterized by $^1$H-NMR.

$^1$H NMR (A113/CD$_3$OD): —CH$_3$ 1.32 and 1.37 ppm (6H), —OH 4.9 ppm (about 0.5H) and a complex pattern of signals at 3.5-4.3 ppm (about 9.5H) due to other protons (the complexity is originated by the presence of the cyclic ketal which contains a stereogenic center).

Step 2.4: Deprotection

Same procedure as detailed in Example 1, step 1.4, was followed but charging the reactor with 1.64 Kg of the product obtained as in Example 2, step 2.3.

A clear solid product (1.58 Kg) was recovered by distillation under reduced pressure and characterized by $^1$H-NMR following same procedure as detailed in Example 1, synthesis of mixture (M1).

Also, compounds having at least one end-group having formula —$CF_2CH_2OH$ were detected (3% by moles).

As determined by GPC analysis, the product had an average molecular weight of 2125 g/mol and a polydispersity index of 1.29.

EXAMPLE 3

Synthesis of Mixture (M3)

Reaction of FOMBLIN® Z-DOL 1000 PFPE (Polydispersity Index of About 1.07) with Glycidol Same procedure as detailed in Example 1, synthesis of mixture (M1), was followed, but reacting into a 5 lt. reactor 2.0 eq. of FOMBLIN® Z-DOL 1000 PFPE (EW 501 g/eq.; polydispersity index of about 1.07), 0.20 moles of potassium tert-butylate and 2.7 moles of glycidol during 5 hours and recovering a crude product by washing with a mixture of 350 g of demineralised water, 100 g of a 30 wt. % aqueous solution of HCl and 350 g of isobutylic alcohol and subsequent washing with 2×240 g of demineralised water.

The reaction product (1.11 Kg, 1.89 eq.) was recovered by distillation under reduced pressure (yield: 94.1%) and characterized by $^1$H-NMR analysis following same procedure as detailed in Example 1, synthesis of mixture (M1).

The analysis yielded the following end-groups composition:

3% by moles of end-groups of formula —$CF_2CH_2OH$;

71% by moles of end-groups of formula —$CF_2CH_2OCH_2CH(OH)CH_2OH$;

26% by moles of end-groups of formula —$CF_2CH_2OCH_2CH(OH)CH_2OCH_2CH(OH)CH_2OH$.

As determined by GPC analysis, the product had an average molecular weight of 1207 g/mol and a polydispersity index of 1.06.

Step 3.1: Protection of Vicinal Hydroxyl Groups

Same procedure as detailed in Example 1, step 1.1, was followed but charging the reactor with 1.11 Kg (1.89 eq.) of the product obtained as in Example 3, synthesis of mixture

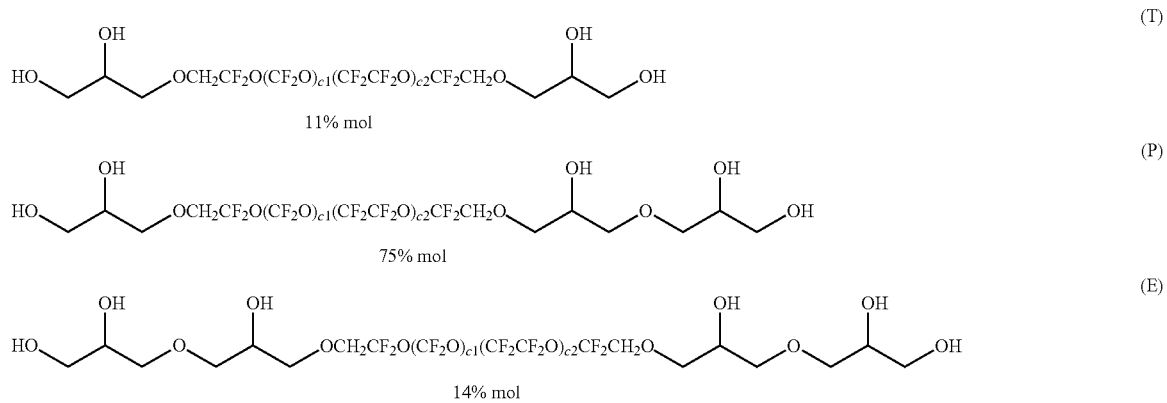

(M3), 900 g of acetone, 425 g of petroleum ether and 0.5 ml of 96% sulphuric acid and, when water evolution stopped (about 15 hours), adding to the reaction mixture 5 g of anhydrous sodium acetate.

A clear low-viscous product (1.17 Kg, 1.89 eq.) was isolated (yield: 98%) and characterized by $^1$H-NMR analysis.

Step 3.2 and 3.3: Adsorption/Desorption on Silica Gel and Distillation Under Reduced Pressure Same procedure as detailed in Example 1, step 1.2 and 1.3, was followed but charging a 10 lt. reactor with 1.17 Kg (1.89 eq.) of the product obtained as in Example 3, step 3.1, 6 Kg of GALDEN® ZV60 PFPE and 0.90 Kg of silica gel (60-90 mesh) dried at 200° C. for 15 hours and then treating silica gel recovered from filtration of the so-obtained suspension with 2.2 Kg of methanol during 4 hours.

A clear low-viscous product (0.51 Kg, 0.85 eq.) was isolated by filtration and subsequent distillation under reduced pressure (yield: 95%) and characterized by $^1$H-NMR.

$^1$H NMR (A113/CD$_3$OD): —CH$_3$ 1.32 and 1.37 ppm (6H), —OH 4.9 ppm (about 0.5H) and a complex pattern of signals at 3.5-4.3 ppm (about 9.5H) due to other protons (the complexity is originated by the presence of the cyclic ketal which contains a stereogenic center).

Step 3.4: Deprotection

Same procedure as detailed in Example 1, step 1.4, was followed but reacting 0.51 Kg of the product obtained as in Example 3, step 3.3, 200 g of methanol, 85 g of demineralised water and 20 g of a 30 wt. % aqueous solution of HCl during 6 hours.

A clear solid product (0.47 Kg) was recovered by distillation under reduced pressure and characterized by $^1$H-NMR following same procedure as detailed in Example 1, synthesis of mixture (M1).

The analysis yielded the following end-groups composition:

48.5% by moles of end-groups of formula —CF$_2$CH$_2$OCH$_2$CH(OH)CH$_2$OH;

51.5% by moles of end-groups of formula —CF$_2$CH$_2$OCH$_2$CH(OH)CH$_2$OCH$_2$CH(OH)CH$_2$OH.

The composition of the mixture, as determined by $^1$H-NMR analysis, was the following:

As determined by GPC analysis, the product had an average molecular weight of 620 g/mol and a polydispersity index of 1.07.

EXAMPLE 4

Synthesis of mixture (M4)

Reaction of FOMBLIN® Z-DOL 3000 PFPE (Polydispersity Index of About 1.08) with Glycidol Same procedure as detailed in Example 1, synthesis of mixture (M1), was followed, but reacting 3.5 eq. of FOMBLIN® Z-DOL 3000 PFPE (EW 1520 g/eq.; polydispersity index of about 1.08) with 4.73 moles of glycidol during 5 hours.

The reaction product (5.55 Kg, 3.43 eq.) was recovered by distillation under reduced pressure (yield: 98%) and characterized by $^1$H-NMR analysis following same procedure as detailed in Example 1, synthesis of mixture (M1).

The analysis yielded the following end-groups composition:

6% by moles of end-groups of formula —CF$_2$CH$_2$OH;

71% by moles of end-groups of formula —CF$_2$CH$_2$OCH$_2$CH(OH)CH$_2$OH;

23% by moles of end-groups of formula —CF$_2$CH$_2$OCH$_2$CH(OH)CH$_2$OCH$_2$CH(OH)CH$_2$OH.

As determined by GPC analysis, the product had an average molecular weight of 3151 g/mol and a polydispersity index of 1.10.

Step 4.1: Protection of Vicinal Hydroxyl Groups

Same procedure as detailed in Example 1, step 1.1, was followed but charging the reactor with 5.55 Kg (3.43 eq.) of the product obtained as in Example 4, synthesis of mixture (M4), and refluxing under stirring the reaction mixture until water evolution stopped (about 25 hours). A clear low-viscous product (5.53 Kg, 3.36 eq.) was isolated (yield: 98%) and characterized by $^1$H-NMR analysis.

Step 4.2 and 4.3: Adsorption/Desorption on Silica Gel and Distillation Under Reduced Pressure Same procedure as detailed in Example 1, step 1.2 and 1.3, was followed but charging the reactor with 5.53 Kg (3.36 eq.) of the product obtained as in Example 4, step 4.1, and then treating silica gel recovered from filtration of the obtained suspension with 4.5 Kg of methanol during 5 hours.

A clear low-viscous product (2.1 Kg, 1.27 eq.) was isolated by filtration and subsequent distillation under reduced pressure (yield: 95%) and characterized by $^1$H-NMR.

$^1$H NMR (A113/CD$_3$OD): —CH$_3$ 1.32 and 1.37 ppm (6H), —OH 4.9 ppm (about 0.5H) and a complex pattern of signals at 3.5-4.3 ppm (about 9.5H) due to other protons (the complexity is originated by the presence of the cyclic ketal which contains a stereogenic center).

Step 4.4: Deprotection

Same procedure as detailed in Example 1, step 1.4, was followed but reacting 2.05 Kg of the product obtained as in Example 4, step 4.3, 370 g of methanol, 160 g of demineralised water and 50 g of a 30 wt. % aqueous solution of HCl during 8 hours.

A clear solid product (2.05 Kg) was recovered by distillation under reduced pressure and characterized by $^1$H-NMR following same procedure as detailed in Example 1, synthesis of mixture (M1).

The analysis yielded the following end-groups composition:
 1% by moles of end-groups of formula —CF$_2$CH$_2$OH;
 50% by moles of end-groups of formula —CF$_2$CH$_2$O—CH$_2$CH(OH)—CH$_2$OH;
 49% by moles of end-groups of formula —CF$_2$CH$_2$O—CH$_2$CH(OH)—CH$_2$O—CH$_2$—CH(OH)—CH$_2$OH.

The composition of the mixture, as determined by $^1$H-NMR analysis, is the following:

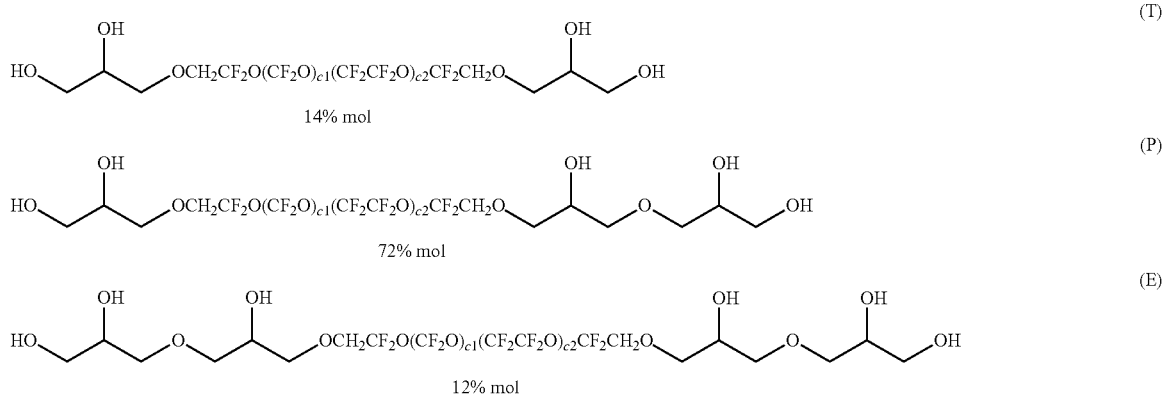

Also, compounds having at least one end-group having formula —CF$_2$CH$_2$OH were detected (2% by moles).

As determined by GPC analysis, the product had an average molecular weight of 3032 g/mol and a polydispersity index of 1.09.

The invention claimed is:

1. A process for the purification of a polyol (per)fluoropolyether derivative [polyol (P)] from a mixture of hydroxyl(per)fluoropolyether derivatives [mixture (M)], said polyol (P) comprising one or more hydroxyl(per)fluoropolyether derivatives [PFPEs (OH)] comprising at least one (per)fluoropolyoxyalkylene chain (chain $R_f$) and at least one end-group having formula ($t_3$):

—CF$_2$CH$_2$OCH$_2$CH(OH)CH$_2$OCH$_2$CH(OH)CH$_2$OH said mixture (M) comprising said polyol (P) and at least one hydroxyl(per)fluoropolyether derivative [PFPE (OH)], said PFPE (OH) being different from said polyol (P) and comprising at least one (per)fluoropolyoxyalkylene chain (chain $R_f$) and at least one end-group selected from the group consisting of end-groups having formula ($t_1$):

CF$_2$CH$_2$OH and end-groups having formula ($t_2$): CF$_2$CH$_2$OCH$_2$CH(OH)CH$_2$OH, said process comprising the following steps:
 step 1: reacting said mixture (M) with a ketone, an aldehyde, or a combination thereof so as to yield a corresponding mixture of cyclic ketal/acetal (per)fluoropolyether derivatives [PFPEs (OH)$_p$] [protected mixture (P)];
 step 2: submitting said protected mixture (P) to adsorption on a silica gel so as to yield an adsorbed protected product [adsorbed product (P$_p$)] and then recovering a desorbed protected product [desorbed product (P$_p$)] by subsequent desorption from said silica gel of said adsorbed product (P$_p$);
 step 3: distilling said desorbed product (P$_p$) under reduced pressure so as to isolate a protected product residue [product (P$_r$)]; and
 step 4: hydrolyzing said product (P$_r$) so as to obtain said polyol (P).

2. The process according to claim 1, wherein said hydroxyl (per)fluoropolyether derivative [PFPE (OH)] complies with formula (III-A):

T$_1$-O(CF$_2$O)$_{c1}$(CF$_2$CF$_2$O)$_{c2}$-T$_2$, wherein:

T$_1$ and T$_2$, equal to or different from each other, are independently selected from the group consisting of said end-groups having said formula ($t_1$), said end-groups having said formula ($t_2$), and said end-groups having said formula ($t_3$); and said c1 and c2 are independently integers>0 such that the sum c1+c2 is in the range between 5 and 2000, the recurring units being statistically distributed along the (per)fluoropolyoxyalkylene chain.

3. The process according to claim 1, wherein said polyol (P) comprises a hydroxyl(per)fluoropolyether derivative

[PFPE (OH)] complying with a formula (III-A): $T_1$-O(CF$_2$O)$_{c1}$ (CF$_2$CF$_2$O)$_{c2}$-T$_2$, wherein one of $T_1$ and $T_2$ is an end-group having said formula ($t_3$): —CF$_2$CH$_2$OCH$_2$CH(OH)CH$_2$OCH$_2$CH(OH)CH$_2$OH, the remainder being an end-group having said formula ($t_2$):

CF$_2$CH$_2$OCH$_2$CH(OH)CH$_2$OH.

4. The process according to claim 1, wherein said mixture (M) comprises a polyol (P) comprising one or more said hydroxyl(per)fluoropolyether derivatives [PFPEs (OH)] comprising at least one said (per)fluoropolyoxyalkylene chain (chain $R_f$) and at least one end-group having said formula ($t_3$): —CF$_2$CH$_2$OCH$_2$CH(OH)CH$_2$OCH$_2$CH(OH)CH$_2$OH and at least one hydroxyl(per)fluoropolyether derivative [PFPE (OH)] which is different from said polyol (P) and complies with formula (III-A): $T_1$-O(CF$_2$O)$_{c1}$ (CF$_2$CF$_2$O)$_{c2}$-T$_2$, wherein $T_1$ and $T_2$ independently represent end-groups selected from the group consisting of said end-groups having formula ($t_1$): —CF$_2$CH$_2$OH and said end groups having formula ($t_2$): —CF$_2$CH$_2$OCH$_2$CH(OH)CH$_2$OH.

5. The process according to claim 1, wherein said mixture (M) is manufactured by reacting at least one dial (per)fluoropolyether derivative [PFPE (OH)$_2$] comprising at least one said (per)fluoropolyoxyalkylene chain (chain $R_f$) and two diol end-groups with glycidol.

6. The process according to claim 5, wherein said diol (per)fluoropolyether derivative [PFPE (OH)$_2$] complies with formula (I-A):

$T_1$—O—$R_f$-T$_2$, wherein:

$R_f$ is said (per)fluoropolyoxyalkylene chain (chain $R_f$);
$T_1$ and $T_2$ both comply with end-groups having said formula ($t_1$): —CF$_2$CH$_2$OH.

7. The process according to claim 5, wherein said diol (per)fluoropolyether derivative [PFPE (OH)$_2$] has a polydispersity index (PDI) ranging from 1 to 1.4.

8. The process according to claim 5, wherein the glycidol/PFPE (OH)$_2$ equivalent ratio is higher than 1.1 and lower than 1.4.

9. The process according to claim 1, wherein said cyclic ketal/acetal (per)fluoropolyether derivative [PFPE (OH)$_p$] complies with formula (I-B): $T'_1$-O—$R_f$-T'$_2$, wherein:

$R_f$ is said (per)fluoropolyoxyalkylene chain (chain $R_f$); and
$T'_1$ and $T'_2$, equal to or different from each other, are independently selected from the group consisting of said end-groups having said formula ($t_1$), end-groups having a formula ($t_{2p}$), and end-groups having a formula ($t_{3p}$):

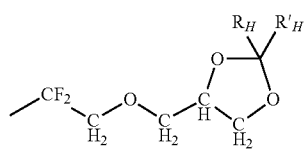

($t_{2p}$)

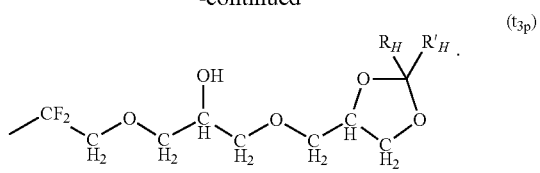

($t_{3p}$)

10. The process according to claim 9, wherein said protected mixture (P) comprises a hemi-protected polyol (P) [polyol ($P_p$)], said polyol ($P_p$) comprising one or more said cyclic ketal/acetal (per)fluoropolyether derivatives [PFPEs (OH)$_p$] comprising at least one said (per)fluoropolyoxyalkylene chain (chain $R_f$) and at least one end-group having said formula ($t_{3p}$), and at least one said cyclic ketal/acetal (per)fluoropolyether derivative [PFPE (OH)$_p$] which is different from said polyol ($P_p$) and comprises at least one said (per)fluoropolyoxyalkylene chain (chain $R_f$) and at least one end-group selected from the group consisting of end-groups having said formulae ($t_1$) and end-groups having said formula ($t_{2p}$).

11. The process according claim 1, wherein in said step 2, said protected mixture (P) is submitted to said adsorption on said silica gel in the presence of (per)fluoropolyethers having non functional end-groups which are able to dissolve said protected mixture (P).

12. The process according to claim 11, wherein said (per)fluoropolyethers having non functional end-groups comply with formula:

$E_1$-O—(CFX$^{E1}$O)$_{e1}$(CFX$^{E2}$CFX$^{E3}$O)$_{e2}$(CF$_2$CF$_2$CF$_2$O)$_{e3}$(CF$_2$CF$_2$CF$_2$CF$_2$O)$_{e4}$-E$_2$ wherein:

X$^{E1}$, X$^{E2}$ and X$^{E3}$, equal to or different from each other, are independently selected from the group consisting of a fluorine atom and a —CF$_3$ group;
$E_1$ and $E_2$ are $C_1$-$C_6$ (per)fluoroalkyl groups, optionally comprising an atom selected from the group consisting of hydrogen and chlorine;
e1, e2, e3 and e4, equal to or different from each other, are independently integers≥0 such that the sum c1+c2+c3+c4 is in the range between 1 and 100, wherein at least two of e1, e2, e3 and e4 are different from zero, and wherein the recurring units are statistically distributed along the (per)fluoropolyoxyalkylene chain.

13. The process according to claim 11, wherein in said step 2, said desorption from said silica gel of said adsorbed product ($P_p$) is carried out by extracting said adsorbed product ($P_p$) by one or more organic solvents (S') and then recovering by separation from said silica gel the corresponding desorbed product ($P_p$).

14. The process according to claim 13, wherein said organic solvent (S') is a polar organic solvent (S'$_p$).

* * * * *